(12) United States Patent
Jayaswal

(10) Patent No.: US 10,545,855 B1
(45) Date of Patent: Jan. 28, 2020

(54) SOFTWARE TESTING ASSURANCE THROUGH INCONSISTENT TREATMENT DETECTION

(71) Applicant: Microsoft Technology Licensing, LLC, Redmond, WA (US)

(72) Inventor: Manish Kumar Jayaswal, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/146,274

(22) Filed: Sep. 28, 2018

(51) Int. Cl.
*G06F 9/44* (2018.01)
*G06F 11/36* (2006.01)
*G06F 8/65* (2018.01)
*G06F 8/71* (2018.01)
*G06F 11/34* (2006.01)

(52) U.S. Cl.
CPC ............ *G06F 11/3676* (2013.01); *G06F 8/65* (2013.01); *G06F 8/71* (2013.01); *G06F 11/34* (2013.01); *G06F 11/3608* (2013.01); *G06F 11/3664* (2013.01); *G06F 11/3672* (2013.01); *G06F 2221/033* (2013.01)

(58) Field of Classification Search
CPC ............. G06F 11/3636; G06F 11/3664; G06F 11/366; G06F 11/324; G06F 11/3672; G06F 17/5022; G06F 21/577
See application file for complete search history.

(56) References Cited

U.S. PATENT DOCUMENTS

| 9,164,874 B1* | 10/2015 | Tomay ................. G06F 11/366 |
| 2006/0085713 A1* | 4/2006 | Takabatake ......... G06F 17/5022 |
| | | 714/741 |
| 2010/0146339 A1* | 6/2010 | Hansson ............... G06F 11/324 |
| | | 714/37 |

(Continued)

FOREIGN PATENT DOCUMENTS

WO 2018029668 A1 2/2018

OTHER PUBLICATIONS

"Top 15 Best Test Management Tools in 2018 (Our Reviews)", retrieved from <<https://www.softwaretestinghelp.com/15-best-test-management-tools-for-software-testers/>>, Jul. 3, 2018, 30 pages.

(Continued)

*Primary Examiner* — Tuan A Vu
(74) *Attorney, Agent, or Firm* — Ogilvie Law Firm

(57) ABSTRACT

Tools and techniques are described to detect possible holes in automated testing of software under development. Full line coverage by tests does not necessarily indicate actual coverage of execution scenarios, e.g., condition coverage, decision coverage, and other kinds of execution scenario coverage may be lacking even when all source code statements are nominally covered. When source code changes are submitted, and corresponding test-sets remain unchanged, users are notified that adequate testing is not assured by the current test-set. Testing assurance code in a development tool chain may flag a pull request, test-set, or source code submission to indicate a lack of testing assurance. In some cases, an assurance-enhanced tool may require that new or different tests be provided with updated source code as a prerequisite for that source code to be accepted for inclusion in a repository or a build, for example.

20 Claims, 5 Drawing Sheets

(56) References Cited

U.S. PATENT DOCUMENTS

| | | | |
|---|---|---|---|
| 2011/0054643 A1* | 3/2011 | Law | G06F 11/3636 700/79 |
| 2011/0197176 A1* | 8/2011 | Muharsky | G06F 11/3672 717/113 |
| 2011/0224939 A1 | 9/2011 | Jayaswal et al. | |
| 2012/0192153 A1* | 7/2012 | Venkatraman | G06F 11/3664 717/124 |
| 2017/0091460 A1* | 3/2017 | Kuhr | G06F 21/577 |

OTHER PUBLICATIONS

"The Ultimate List of Code Coverage Tools: 25 Code Coverage Tools for C, C++, Java, .Net, and More", retrieved from <<https://stackify.com/code-coverage-tools/>>, May 30, 2017, 19 pages.

"Test automation management tools", retrieved from <<https://en.wikipedia.org/wiki/Test_automation_management_tools>>, Feb. 2, 2018, 2 pages.

"Code coverage", retrieved from <<https://en.wikipedia.org/wiki/Code_coverage>>, Sep. 2, 2018, 3 pages.

"Update the test case status", retrieved from <<https://docs.servicenow.com/bundle/london-it-business-management/page/product/test-management/task/t_UpdateTheTestCaseStatus.html>>, Jul. 26, 2018, 2 pages.

"Linking Test Cases with Test Suites", retrieved from <<https://qmetrysupport.atlassian.net/wiki/spaces/QES/pages/27754536/Linking+Test+Cases+with+Test+Suites>>, Sep. 14, 2017, 4 pages.

"Test Suites—Update Suite Test Cases", retrieved from <<https://docs.microsoft.com/en-us/rest/api/vsts/test/test%20%20suites/update%20suite%20test%20cases?view=vsts-rest-5.0>>, retrieved Sep. 14, 2018, 9 pages.

"Update Test Case in Test Suite", retrieved from <<https://discuss.gurock.com/t/update-test-case-in-test-suite/2014>>, Jul. 7, 2015, 2 pages.

"Development and Acquisition", retrieved from <<https://ithandbook.ffiec.gov/it-booklets/development-and-acquisition/maintenance/routine-modifications.aspx>>, retrieved Sep. 14, 2018, 10 pages.

"GitHub", retrieved from <<https://en.wikipedia.org/wiki/GitHub>>, Sep. 7, 2018, 12 pages.

"Version control", retrieved from <<https://en.wikipedia.org/wiki/Version_control>>, Sep. 6, 11 pages.

"Change control", retrieved from <<https://en.wikipedia.org/wiki/Change_control>>, Jun. 7, 2018, 4 pages.

"Tracking changes to the Test Case and Test Run Statuses", retrieved from <<https://social.msdn.microsoft.com/Forums/vstudio/en-US/22def5a3-d1e9-401e-af25-cccab4c891a7/tracking-changes-to-the-test-case-and-test-run-statuses?forum=vsmantest>>, May 26, 2016, 3 pages.

"FAQs for manual testing", retrieved from <<https://docs.microsoft.com/en-us/azure/devops/test/reference-qa?view=vsts>>, Aug. 23, 2018, 29 pages.

Manoj Bableshwar, "Test Plan and Test Suite Customization with TFS2013 Update3", retrieved from <<https://blogs.msdn.microsoft.com/devops/2014/05/23/test-plan-and-test-suite-customization-with-tfs2013-update3/>>, May 23, 2014, 11 pages.

"Provide a way to track history of test plan and test suites", retrieved from <<https://visualstudio.uservoice.com/forums/330519-visual-studio-team-services/suggestions/2039041-provide-a-way-to-track-history-of-test-plan-and-te>>, Jul. 15, 2011, 2 pages.

"Automatic testing and merging of pull requests (+assigning reviewers) #106", retrieved from <<https://github.com/nodejs/build/issues/106>>, Jun. 2, 2015, 3 pages.

"Add default reviewers to pull requests", retrieved from <<https://confluence.atlassian.com/bitbucketserver/add-default-reviewers-to-pull-requests-834221295.html>>, Sep. 21, 2017, 5 pages.

"Reviewing proposed changes in a pull request", retrieved from <<https://help.github.com/articles/reviewing-proposed-changes-in-a-pull-request/>>, retrieved Sep. 14, 2018, 3 pages.

Mark Johnson, "What Is a Pull Request?", retrieved from <<http://oss-watch.ac.uk/resources/pullrequest>>, Nov. 8, 2013, 6 pages.

"Visual Studio Code", retrieved from <<https://en.wikipedia.org/wiki/Visual_Studio_Code>>, Jul. 7, 2018, 8 pages.

"Visual Studio Extensibility", retrieved from <<https://en.wikipedia.org/wiki/Visual_Studio_Extensibility>>, May 27, 2018, 3 pages.

"International Search Report and Written Opinion Issued in PCT Application No. PCT/US19/039125", dated Oct. 8, 2019, 11 Pages.

* cited by examiner

EXAMPLES OF KINDS 300 OF CODE COVERAGE 302

| | |
|---|---|
| FUNCTION 304 | DECISION 306 |
| STATEMENT 308 | FINITE STATE MACHINE 310 |
| BRANCH 312 | ENTRY/EXIT 314 |
| PATH 316 | DATA-FLOW 318 |
| CONDITION 320 | LOOP 322 |

Fig. 3

SOME TREATMENT CONSISTENCY SCENARIOS 400

| | |
|---|---|
| SCENARIO A: CHANGED TEST 232 COVERS ENTIRE SUBMITTED CODE PORTION (INCLUDING UPDATE) | SCENARIO B: UNCHANGED TEST 232 COVERS ENTIRE SUBMITTED CODE PORTION (INCLUDING UPDATE) |
| SCENARIO C: CHANGED TEST 232 COVERS UPDATE IN SUBMITTED CODE PORTION | SCENARIO D: UNCHANGED TEST 232 COVERS UPDATE IN SUBMITTED CODE PORTION |
| SCENARIO E: CHANGED TEST 232 COVERS NON-UPDATE PART OF SUBMITTED CODE PORTION | SCENARIO F: NO TEST 232 COVERS UPDATE IN SUBMITTED CODE PORTION |

SCENARIO G: NO TEST 232 COVERS ANY PART OF THE SUBMITTED CODE PORTION

Fig. 4

REPOSITORY 902, 102

SOFTWARE TESTING ASSURANCE THROUGH INCONSISTENT TREATMENT DETECTION

BACKGROUND

A computer program can be tested by feeding it input values and comparing the resulting behavior and output to what is expected. However, the testing of any except the simplest program is likely to be incomplete, in that many aspects of the program's possible behavior are not exercised during testing. For instance, many programs can be given an extremely large number of different input values. A program might accept an email address, telephone number, or other input from a collection of possible inputs that includes both an arbitrarily large number of valid values and an arbitrarily large number of invalid values. Also, the number of different paths a program might take during execution can be immense. If a given program contains twenty decision points with corresponding decision conditions where execution follows one branch if the condition is true and another branch when the condition is false, then there are over a million different paths through that program. Widely available software applications can have thousands of such decision points, not a mere twenty, and the number of paths through an application program's code grows accordingly.

A computer program can be tested manually by a person who feeds the program input values, but many programs are now tested at least in part by automated tests. Test automation tools feed inputs to a program under test, and automatically check the resulting behavior and output against criteria specified in a testing suite. Automated testing makes it possible to test programs more thoroughly, and in a more consistent manner. But even with automated testing it may happen that some aspects of a program are not exercised, or in some way are otherwise not fully tested. For instance, not even an automated test can input every possible email address, telephone number, or other input to a program to check that the program behaves correctly for each input. Also, for most if not all commercial programs, automating the testing of the program does not inherently provide the computing resources that would be needed to execute every single path that can be taken through the program, so many paths go untested.

SUMMARY

Some teachings herein were motivated by an initial technical challenge of ensuring code quality in conjunction with repository pull requests. An emergent technical challenge was how to improve automated test coverage. In this context the inventor concluded that existing approaches may assume wrongly that code coverage equals testing coverage, and identified the technical challenge of how to usefully coordinate source code changes with testing suites. Other technical challenges addressed by the innovations taught here will also be apparent to one of skill from the discussion provided below.

Some embodiments provide software testing assurance technology, namely, technology which enhances or provides assurance as to the nature or extent of coverage of software by automated testing. Some of these software testing assurance embodiments include a processor, a memory in operable communication with the processor, and an assurance code. Upon execution with the processor, the assurance code receives a code update submission denoted here as S-current. The submission S-current includes a portion, denoted here as P-current, which includes an update to a source code. The assurance code determines that the portion P-current is at least partially covered by a test-set (denoted here as TS-current) of a testing suite. The assurance code ascertains whether the test-set TS-current differs from a test-set TS-prior which at least partially covered a portion P-prior of a code update submission S-prior. In this example, S-prior is older than S-current, and P-current updates P-prior. The assurance code flags at least one item to indicate a lack of testing assurance for the P-current update based on the TS-current test-set when the ascertaining ascertains that TS-current does not differ from TS-prior. That is, the assurance code raises a flag of at least one of the following items: S-current, P-current, or TS-current.

Some software testing assurance embodiments provide or use particular actions. For example, an embodiment may receive a code update submission S-current which includes a portion P-current having one or more lines of a source code, including an update to the source code. The embodiment may determine that the portion P-current of source code is at least partially covered by a test-set TS-current of a testing suite, and may ascertain whether the test-set TS-current differs from a test-set TS-prior which at least partially covered a portion P-prior of a code update submission S-prior. In this context, S-prior is older than S-current, and P-current updates P-prior. The embodiment may flag at least one item to indicate a lack of testing assurance for the update contained in P-current based on the TS-current test-set when TS-current does not differ from TS-prior, and may otherwise avoiding flagging any item on the basis of TS-current not differing from TS-prior relative to P-current. The item(s) flagged may be an update submission, or submitted code, or a test-set, or a combination of these items, each flagged item being as it existed in a past version, current version, or both.

Other technical activities pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIG. 3 is a block diagram illustrating examples of different kinds of code coverage with regard to automated testing;

FIG. 4 is a block diagram illustrating some scenarios corresponding to different treatments of source code and of tests, with respect to bug fixes or feature changes;

DETAILED DESCRIPTION

Overview

Figure 1:
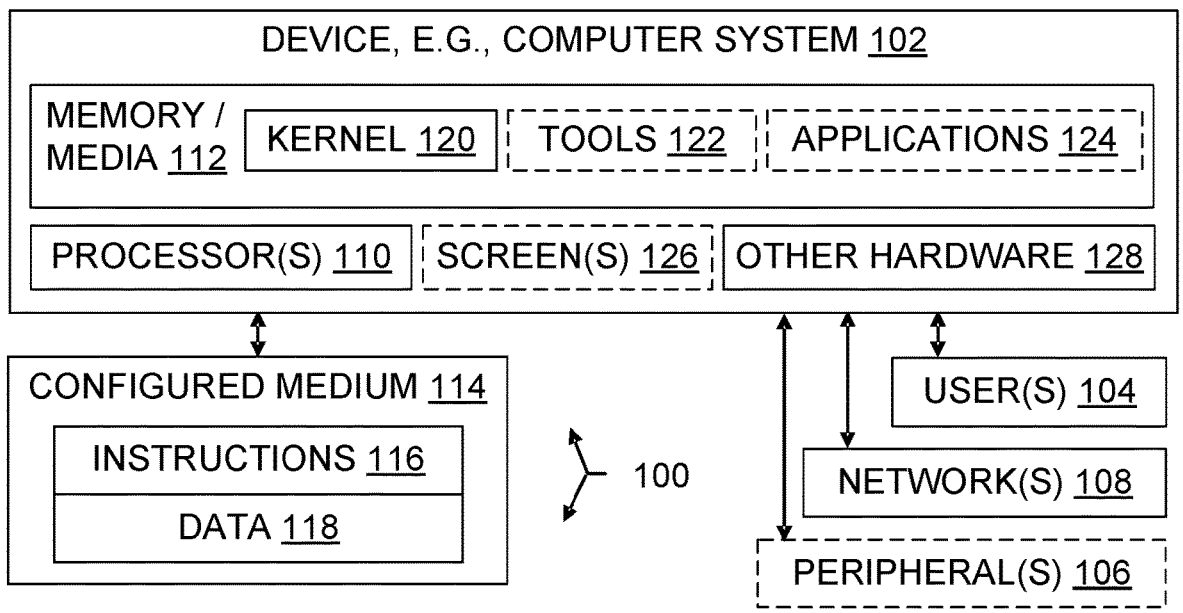
FIG. 1 is a block diagram illustrating a computer system and also illustrating a configured storage medium.

Innovations may expand beyond their origins, but understanding an innovation's origins can help one more fully appreciate the innovation even when the innovation has grown well beyond its original focus. In the present case, software testing assurance innovations arose in the context of the inventor seeking ways to improve software component functionalities by improving automated tests of those functionalities.

Many software development teams use code coverage information to detect deficiencies in test coverage. However there are instances where a line of code is nominally covered by a test but the test does not necessarily cover all the execution scenarios. Therefore, bugs may get introduced when such code is changed. Purely depending on apparent code coverage to highlight a lack of test coverage is not enough in such cases to properly manage test technical debt. Some embodiments described herein check for this situation and alert the user, who may be, e.g., a developer or a tester. "Technical debt" increases when code is added to project without also adding thorough automated tests of that code.

When a developer changes a line of code to fix a bug, or to add some functionality, corresponding changes in the automated testing are prudent. If none of the tests covering an edited line are altered, and no new tests are written which cover that line, then there is a testing hole to be filled, even if a code coverage report shows that the line is covered. Smart detection of code updates lacking in test coverage recognizes that a given line of code in an update may be mistakenly considered covered when it is subject to any automated test, instead of recognizing and acting on the possibility that the coverage is only partial.

Test coverage extent for code can be defined with respect to the full space of possible states that can occur during execution of the code in question. Testing which does not check the entire space of possible states for correctness provides only partial coverage. As a practical matter, most testing will be partial.

But that does not make testing useless. Indeed, in view of the present disclosure's teachings, it is a reason to focus testing efforts to use limited testing resources in ways which may be more likely to reveal defects, and in particular to focus on flagging potential testing deficiencies as taught herein.

When code is updated, but corresponding tests are not changed, several possibilities exist. One possibility is that the unchanged test adequately covers the updated code, e.g., covers approximately the same percentage of possible execution states as were covered in the previous version of the code. Another possibility is that the update is not being adequately tested. Perhaps there is no test coverage of the update, e.g., lines of code or variable states were added but are not tested. Perhaps there was some test coverage of the update, but the reason for the update is that the testing failed to detect a bug that has now (perhaps) been fixed by the update, so the testing should be updated as well. In other words, it may happen that program tests themselves have bugs, in addition to the widely recognized possibility of bugs in a program that is subject to testing.

In the context of submitting a code update to a repository, the submission may take the form of a "pull request", which is a request that the update be pulled into the repository. If an analysis of code updates, test updates (if any), and test coverage as taught herein reveals that tests have not been prudently updated when code is updated, then that analysis result can be surfaced to the user who submitted the pull request. A submission user interface for the pull request may warn or notify the user of the inconsistency between code updating and test updating. The user interface may suggest or even require that (a) one or more tests be modified to cover the scenario that motivated the code change, or (b) one or more new tests be written and activated in the testing suite to cover the scenario that motivated the code change.

Embodiments taught herein help provide software testing assurance. A lack of testing assurance may occur when source code is being updated but the corresponding automated tests of the code are not also being updated, or when a technical question exists as to whether the tests have been adequately updated. When code is updated, the update may have been done to fix an error that the testing did not catch. Thus, an update to the testing may be helpful to detect the same or similar errors.

Some embodiments described herein may be viewed by some people in a broader context. For instance, concepts such as assurance, consistency, coverage, testing, and updates may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to prioritize alerts. Other configured storage media, systems, and methods involving assurance, consistency, coverage, testing, or updates are outside the present scope. Accordingly, vagueness, mere abstractness, lack of technical character, and accompanying proof problems are also avoided under a proper understanding of the present disclosure.

Technical Character

The technical character of embodiments described herein will be apparent to one of ordinary skill in the art, and will also be apparent in several ways to a wide range of attentive readers. Embodiments address technical activities that are rooted in computing technology, such as automated testing and prompt detection and correction of bugs, which impact a wide range of software components. Some software testing assurance embodiments improve the functioning of computing systems by automatically detecting inconsistencies in the treatment of source code updates versus code testing suite updates, and notifying users that additional or updated tests would be prudent. Detecting potential deficiencies in testing coverage and updating test-sets consistently when the tested code is updated helps make systems that use the updated code operate more securely, efficiently, and effectively.

When a testing deficiency is not detected, time and resources may be wasted by trying to identify, fix, or work around bugs or security weaknesses that would have been addressed sooner and more effectively at the time the updated but buggy code was submitted. Testing assurance can be added to a software development workflow, or be improved within such a workflow. Assurance of test coverage may be improved, for example, by enhancing a development tool, a development tool extension, or a standalone utility in a development tool chain, with assurance code as taught herein. In particular, a continuous integration continuous deployment (CICD) workflow will benefit from improved testing assurance. Bugs are easier and faster to fix when the code containing them is fresh in the developer's mind, e.g., at the point in a CICD workflow where the developer submits modified code for inclusion in a repository or a build.

Other aspects and advantages of the technical characteristics of the teachings will also be apparent to one of skill from the description provided.

Acronyms, Abbreviations, and Names

Some acronyms, abbreviations, and names are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GPU: graphical processing unit
GUI: graphical user interface
IDS: intrusion detection system generally, may be a HIDS (host-based IDS) or a NIDS (network-based IDS), for example
IoT: Internet of things
IP: internet protocol
LAN: local area network
OS: operating system
RAM: random access memory
ROM: read only memory
UEFI: Unified Extensible Firmware Interface
VM: virtual machine
VS: Visual Studio® program (mark of Microsoft Corp.)
VS Code: Visual Studio® Code program (mark of Microsoft Corp.)
WAN: wide area network Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventor asserts and exercises the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code. Code which must be interpreted or compiled in order to execute is often referred to as "source code", but when the context clearly indicates to one of skill that the code in question is source code (e.g., in the context of submitting updated code for inclusion in a repository), source code may be referred to simply as "code".

"Program" is used broadly herein, to include applications, kernels, drivers, interrupt handlers, firmware, state machines, libraries, and other code written by programmers (who are also referred to as developers) and/or automatically generated.

"Service" means a consumable program offering in a cloud computing environment or other network or computing system environment.

"Cloud" means pooled resources for computing, storage, and networking which are elastically available for measured on-demand service. A cloud may be private, public, community, or a hybrid, and cloud services may be offered in the form of infrastructure as a service, platform as a service, software as a service, or another service. Unless stated otherwise, any discussion of reading from a file or writing to a file includes reading/writing a local file or reading/writing over a network, which may be a cloud network or other network, or doing both (local and networked read/write).

"IoT" or "Internet of Things" means any networked collection of addressable embedded computing nodes. Such nodes are examples of computer systems as defined herein, but they also have at least two of the following characteristics: (a) no local human-readable display; (b) no local keyboard; (c) the primary source of input is sensors that track sources of non-linguistic data; (d) no local rotational disk storage—RAM chips or ROM chips provide the only local memory; (e) no CD or DVD drive; (f) embedment in a household appliance; (g) embedment in an implanted medical device; (h) embedment in a vehicle; (i) embedment in a process automation control system; or (j) a design focused on one of the following: environmental monitoring, civic infrastructure monitoring, industrial equipment monitoring, energy usage monitoring, human or animal health monitoring, or physical transportation system monitoring.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Operations such as receiving a source code update submission for inclusion in a build or a repository, determining the extent of coverage of source code by a testing suite, flagging digital artifacts such as code update submissions and test-sets, and executing code, are understood herein as inherently digital. A human mind cannot interface directly with a CPU or other processor, or with RAM or other digital storage, to read and write the necessary data to perform the software testing assurance steps taught herein. One reason—perhaps the main reason—that automated program testing exists is because manual testing alone, using only mental processes or a pencil-and-paper, is grossly insufficient as a practical matter for today's commercial software development efforts. This would all be well understood by persons of skill in the art in view of the present disclosure, but others may sometimes need to be informed or reminded of the facts. Unless stated otherwise, embodiments are presumed to be capable of operating at scale (i.e., operating on event data from one hundred or more monitored devices) in commercial production environments, or in testing labs for production environments, as opposed to being mere thought experiments.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/ Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as accepting, ascertaining, asserting, assuring, building, checking, communicating, covering, determining, discerning, displaying, executing, flagging, generating, invoking, notifying, pulling, reading, receiving, reporting, residing, testing, updating, warning (and accepts, accepted, ascertains, ascertained, etc.) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the *In re Nuijten* case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment
102 computer system, also referred to as computational system or computing system
104 users
106 peripherals
108 network generally, including, e.g., LANs, WANs, software defined networks, and other wired or wireless networks
110 processor
112 computer-readable storage medium, e.g., RAM, hard disks
114 removable configured computer-readable storage medium
116 instructions executable with processor; may be on removable storage media or in other memory (volatile or non-volatile or both)
118 data
120 kernel(s), e.g., operating system(s), BIOS, UEFI, device drivers
122 tools, e.g., anti-virus software, firewalls, packet sniffer software, intrusion detection systems (IDS), intrusion prevention systems (IPS), debuggers, profilers, compilers, interpreters, static code analysis tools, software development tools and tool suites, hardware development tools and tool suites, diagnostics
124 applications, e.g., word processors, web browsers, spreadsheets, games, email tools
126 display screens, also referred to as "displays"
128 computing hardware not otherwise associated with a reference number 106, 108, 110, 112, 114
202 computing system enhanced with software testing assurance technology
204 software testing assurance code
206 user interface to software testing assurance code
208 tool chain, e.g., one or more software development tools 122 which can collectively transform source code to executable code
210 integrated development environment
212 extension to an extensible development tool
214 extensible development tool, e.g., Visual Studio® tool, Visual Studio® Code tool (mark of Microsoft Corp.), Xcode® tool (mark of Apple Computer, Inc.), Android® Studio tool (mark of Google, LLC), and others
216 submission containing (directly as a copy or indirectly by virtue of a pointer, index, or other reference) updated source code; may also contain other data such as a timestamp, digital signature, author name, and remarks; some examples of submissions include (a)

pull requests, (b) submissions to a source code version control system, regardless of whether it uses HTTP, HTTPS or another network protocol, (c) submissions to a source code version control system that does not include a peer review and commenting step, and (d) submissions to a tool chain 218 portion of submission 216 which contains updated source code; may also contain neighboring or surrounding code which is not updated 220 source code 222 update to source code; may take the form of text insertion, text deletion, text substitution, or a mixture thereof; unless otherwise indicated, the "update" is the set of source code lines which embody the text insertion, text deletion, or text substitution, even if not every character of the line in question was changed from the previous version of the source code, but not including lines of source code in which no change was made 224 acceptance status, e.g., accepted/rejected for peer review, accepted/rejected for inclusion in repository, or accepted/rejected for inclusion in build 226 flag, e.g., bit, enumeration value, integer value, or other discrete value indicating whether testing assurance is present, or absent, or under review, for example 228 item related to testing assurance, e.g., a code update submission 216, a code portion 218 of a submission, or a test or test-set 232 for testing code 230 testing suite usable for automated testing of software 232 test-set, namely, one or more specific tests within a testing suite 234 testing coverage reporting tool, e.g., Coverage.py, EMMA, JaCoCo, Serenity BDD, Clover™ (mark of Atlassian Pty Ltd), BullseyeCoverage, CoCo™ (mark of FrogLogic GmbH), or another commercially available tool which reports testing coverage 236 testing coverage report 238 automated testing management tool, e.g., qTest® (mark of QASymphony LLC), PractiTest® (mark of H.S. PractiTest LLC), Inflectra® (mark of Inflectra Corporation), Panaya® (mark of Panaya Ltd.), or another commercially available tool which assists management of automated testing 240 computing system hardware generally, e.g., processor(s) 110, memory 112, screen(s) 126, other hardware 128, and other hardware not specifically numbered but nonetheless taught herein 242 notifications or warnings 244 timestamp 300 kinds of code coverage 302 code coverage by automated testing 304 function coverage, namely, the extent to which each function or other subroutine in code has been called 306 decision coverage, namely, the extent to which entry and exit points in code have been invoked at least once, and to which decisions in the code have taken on all possible outcomes at least once 308 statement coverage, namely, the extent to which each statement in code has been executed 310 finite state machine coverage, namely, the extent to which each state in code implementing a finite state machine been reached 312 branch coverage, namely, the extent to which each branch in a control structure in code has been executed; examples of control structures include if-then statements, switch or case statements, and jump tables 314 entry/exit coverage, namely, the extent to which each entry (e.g., call) and exit (e.g., return) of subroutines in code have been executed 316 path coverage, namely, the extent to which each path through code has been executed 318 data-flow coverage, namely, the extent to which each variable definition and its usage have been reached 320 condition coverage, namely, the extent to which each Boolean sub-expression in code has been evaluated both to true and to false 322 loop coverage, namely, the extent to which each loop has been executed zero times, once, and more than once during execution of the code 400 scenarios illustrating different ways source code 220 and tests 232 may be treated in conjunction with a bug fix or feature change 700 software testing assurance methods; also refers to flowchart illustrating such methods 702 receive a code update submission 704 receive updated source code portion of a code update submission 706 determine updated source code portion 218 is at least partially covered by a test-set 708 ascertain whether a test-set has changed 710 identify source code impact zone of changes in a test-set 712 impact zone of changes in a test-set 714 flag one or more items; also referred to as raising a flag 716 indicate a lack of assurance that adequate test coverage is present 718 avoid flagging any items; also referred to as avoiding raising a flag 800 flowchart 802 assure software testing is optimized 804 software testing (automated unless stated otherwise)

806 cover code with software testing 808 accept updated source code for one or more development activities 810 include source code in a repository 814 peer review of source code 816 build an executable using source code 820 generate a code coverage report 822 check code coverage by one or more test-sets 824 read a coverage report 826 assert a value or equality of values as part of code testing 828 receive a pull request 830 pull request 832 invoke a tool, e.g., a coverage reporting tool or other tool 834 communicate digitally with a tool, e.g., a test management tool or other tool 836 display a notification or warning, e.g., on a screen or in a listing or printout, or place notification or warning in a file or transmit a notification or warning; also refers to actions referred to as notifying or warning 838 reside in a software development tool chain, e.g., within a tool of the tool chain 840 check a timestamp 842 discern pertinence of a test to one or more lines of source code 844 reject submitted code 902 repository, e.g., a repository to facilitate collaboration between developers and to provide version control; some of the most widely used web-based repositories, which provide services for source code and development project hosting, include GitHub® (mark of GitHub, Inc.), BitBucket® (mark of Atlassian Pty Ltd), and SourceForge® (mark of SourceForge Media, LLC)

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, cloud administrators, security personnel, operations personnel, developers, testers, engineers, auditors, and end-users are each a particular type of user 104. Automated agents, scripts, playback software, and the like acting on behalf of one or more people may also be users 104, e.g., to facilitate testing a system 102. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Storage media 112 may be of different physical types. The storage media 112 may be volatile memory, non-volatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage medium 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

A given operating environment 100 may include an Integrated Development Environment (IDE) 210 which provides a developer with a set of coordinated computing technology development tools such as compilers, source code editors, profilers, debuggers, layout tools, simulators, and so on. In particular, some of the suitable operating environments for some software development embodiments include or help create a Microsoft® Visual Studio® development environment (marks of Microsoft Corporation) configured to support program development. Some suitable operating environments include Java® environments (mark of Oracle America, Inc.), and some include environments which utilize languages such as C++ or C# ("C-Sharp"), but many teachings herein are applicable with a wide variety of programming languages, programs, programming models, development tools, and development methodologies.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments peripherals 106 such as human user I/O devices (screen, keyboard, mouse, tablet, microphone, speaker, motion sensor, etc.) will be present in operable communication with one or more processors 110 and memory.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software defined network or a sandboxed or other secure cloud computing environment. A given embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More About Systems

Examples are provided herein to help illustrate aspects of the technology, but the examples given within this document do not describe all of the possible embodiments. Embodiments are not limited to the specific implementations, arrangements, displays, features, approaches, or scenarios provided herein. A given embodiment may include additional or different technical features, mechanisms, sequences, data structures, or functionalities for instance, and may otherwise depart from the examples provided herein.

FIGS. 1-6 illustrate aspects of some architectures that are suitable for embodiments taught herein. With particular attention to FIG. 2, a system 102 may be enhanced by one or more software testing assurance functionalities as described herein to produce or utilize a testing assurance enhanced system 202. An enhanced system 202 includes at least testing assurance code 204 which operates according to at least one example provided herein. The assurance code 204 includes or communicates with a user interface 206; GUIs and other example user interface technologies are discussed elsewhere herein. The assurance code 204 may reside in a development tool chain 208, an integrated development environment 210, a development tool 214, or a development tool extension 212, for example. One of skill will understand that items 208, 210, 212, 214, and 122 are not necessarily mutually exclusive, e.g., a given tool 122 may be a development tool 214 in an IDE 210.

In this example, the enhanced system 202 receives or otherwise includes a code update submission 216 which may contain different portions, e.g., a routing portion, an authorization portion, a history portion, a timestamp 244, and so on. In particular, the code update submission 216 has a portion 218 that directly or indirectly includes source code 220. At least a part of that source code is updated relative to a previous version of the source code; a primary role of the code update submission 216 is to submit an update 222 for inclusion in a body of source code. In practice some submitted source code may have no associated tests 232, but the present disclosure takes particular interest in situations which involve both an updated source code and an associated test-set 232 from a testing suite 230 that can be used to automatically test at least part of the submitted source code in some way to some extent.

In this example, an acceptance status 224 of the submission 216 with regard to one or more workflow states can be tracked in a variable or other data structure. For instance, a given status 224 might indicate that the submission has been received and queued for analysis, or that the submission is undergoing code coverage analysis to discern which parts of the associated test-set (if any) 232 are pertinent to changes to be made 222 in the source code by full acceptance of the submission. More generally, an acceptance status 224 may indicate any position in any workflow or other process discussed herein. When the workflow concludes that test-sets 232 pertinent to an update 222 have not themselves been updated, flags 226 representing that conclusion may be raised on one or more items 228, e.g., a flag may be raised on the submission itself, on the source code in the submission, on the test-set, or on a combination thereof.

In this example, the enhanced system 202 includes or communicates with a coverage reporting tool 234 which generates a coverage report 236 indicating the extent to which submitted source code 220 is covered by associated test suite tests 232. The coverage report may simply indicate which line or lines of code are covered by the tests. But in some embodiments, the coverage report also or alternately indicates what kind 300 of code coverage 302 is provided by the tests 232 that are associated with the submitted code.

FIG. 3 illustrates several kinds of code coverage 302, which are defined in the list of reference numerals, including function coverage 304, decision coverage 306, statement coverage 308, finite state machine coverage 310, branch coverage 312, entry/exit coverage 314, path coverage 316, data-flow coverage 318, condition coverage 320, and loop coverage 322. In situations discussed herein where a single kind of code coverage by tests is indicated but which kind 300 is not explicitly stated, statement coverage 308 is assumed.

In this example, the enhanced system 202 also communicates with or includes an automated testing management tool 238. Although the testing management tool 238 and the coverage reporting tool 234 are depicted in distinct boxes in FIG. 2, those functionalities may be combined into a single tool 122 or be coordinated modules of a given tool chain 208, for example.

Figure 2:
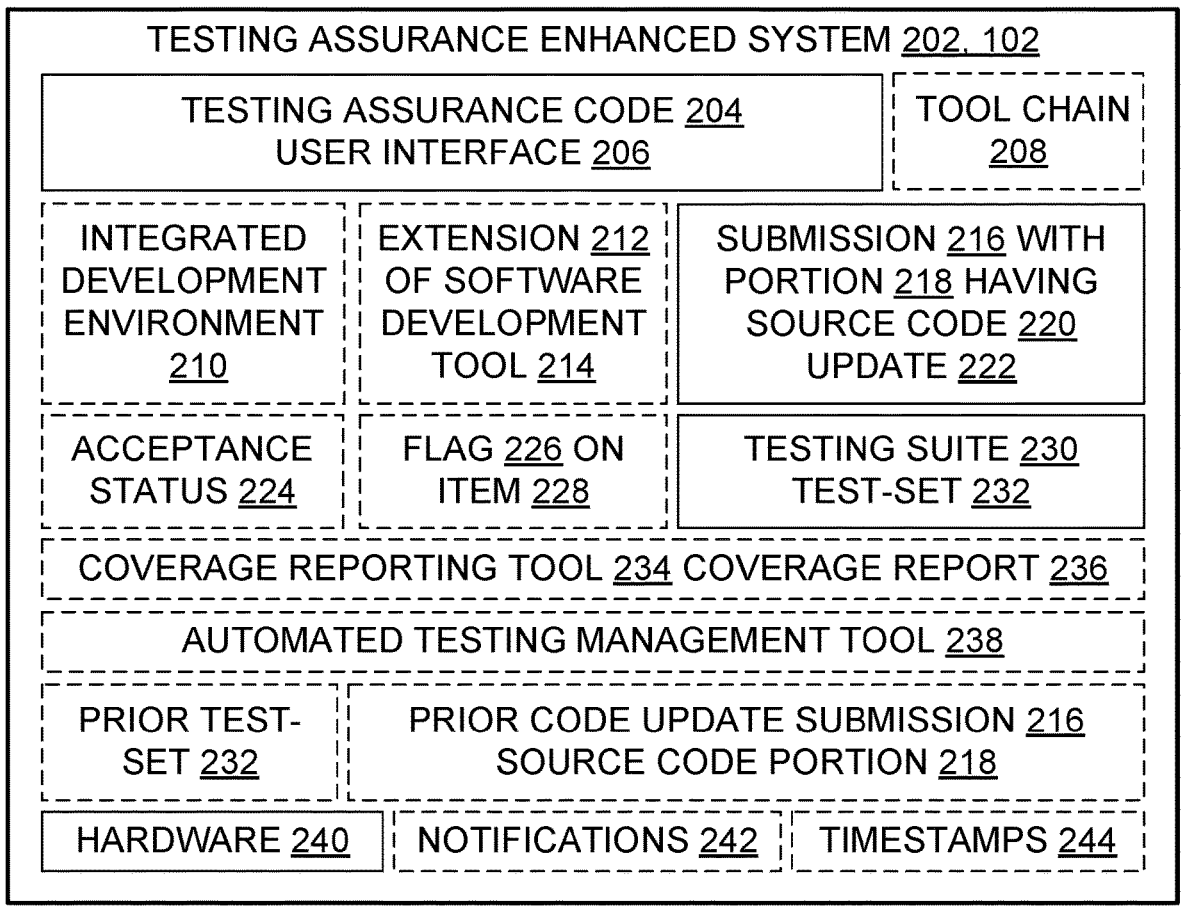
FIG. 2 is a block diagram illustrating aspects of a computing system which is enhanced for testing assurance, showing a testing assurance code and other items.

FIG. 2 also shows notifications 242. For lack of space, FIG. 2 does not also explicitly show warnings 242, but they may also be present in assurance code 204 of an enhanced system 202 or displayed by an enhanced system 202. Notifications provide a user with a conclusion or status regarding an input, e.g., a notification may report an acceptance status or a flag. Notifications are not necessarily negative. Warnings, by contrast, are a type of notification that indicate an error, or indicate an unwanted constraint on development is present or deemed likely to be present. For instance, a warning may tell a user that a submission's code update 222 will not be pulled into a repository until updated tests 232 are submitted and executed against the code update 222.

Figure 5:
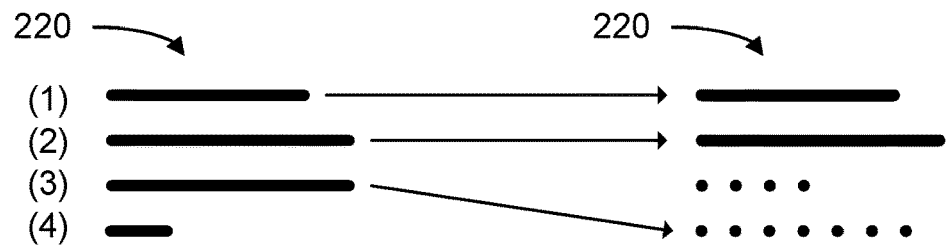
FIG. 5 is an idealized source code diagram illustrating one or more source code updates to implement a bug fix, or a feature change, or both.
Figure 6:
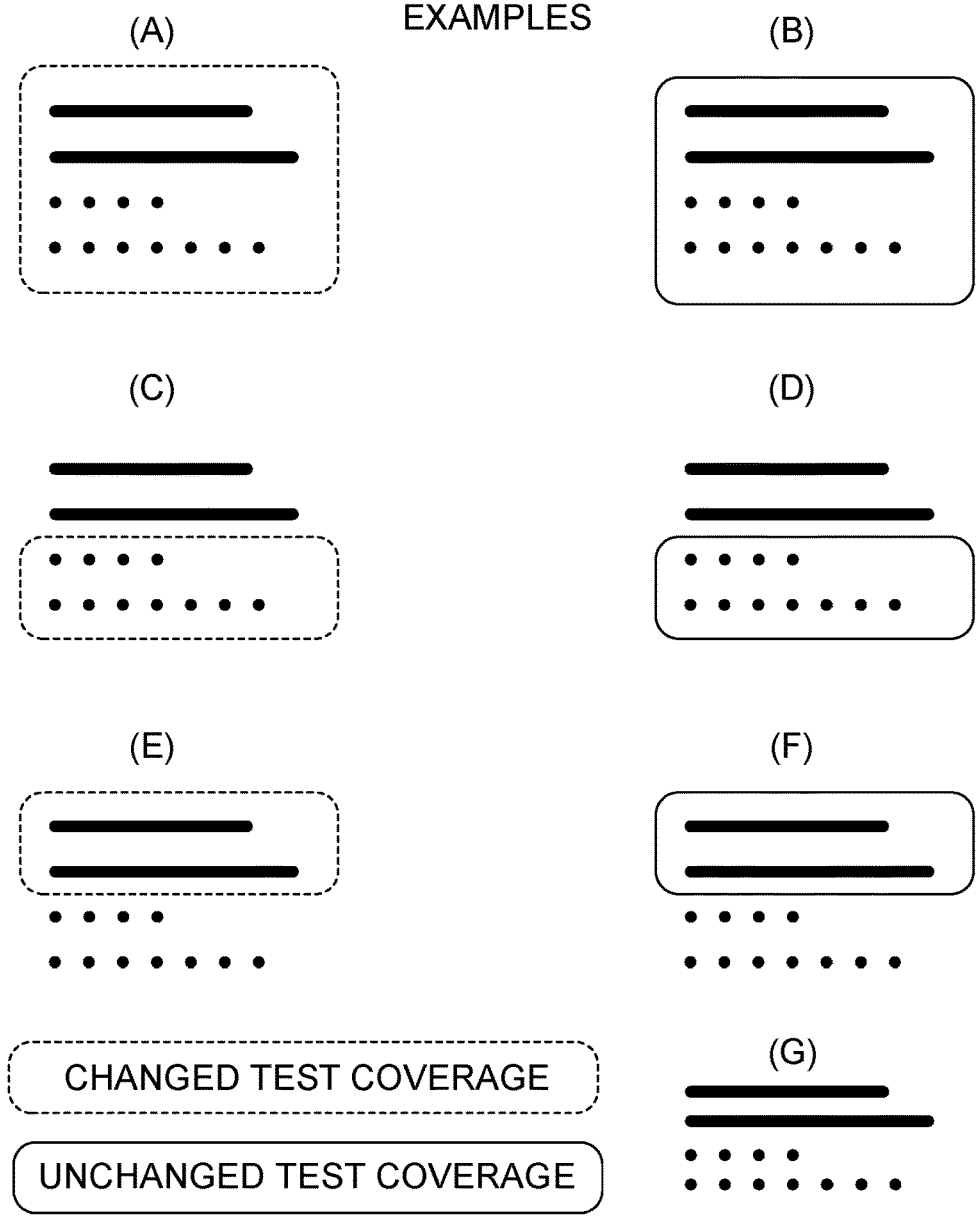
FIG. 6 is an idealized source code diagram illustrating examples of source code coverage by tests, in various scenarios.

FIGS. 4-6 illustrate several scenarios 400 in which source code 220 and associated test-sets 232 may be updated to some extent, ranging from not-at-all to adequately-updated to fully-updated. Other scenarios are also possible; the examples discussed here are not comprehensive. Also, although test updates are required for acceptance of code updates in some situations by some embodiments, as a general matter updates to test-sets 232 are not necessarily compelled under every embodiment presented here, neither in the sense that some kind of test update is compelled, nor in the sense that a test update to provide a particular kind 300 of code coverage 302 is compelled, nor in the sense that a test update to provide a particular extent of code coverage 302 is compelled.

One of skill knowledgeable in project management, for example, will recognize that an update to a test-set is one possible technical effect of an embodiment, but is not the only possible technical effect. Informed acceptance of technical risk is another technical effect, e.g., a developer may be notified of the detected risk that a test update is prudent in view of a source code update, but then decide to accept the risk that bugs have been introduced or remain in the updated code, and choose to proceed to utilize the updated code despite being informed of the technical risk.

Figure 7:
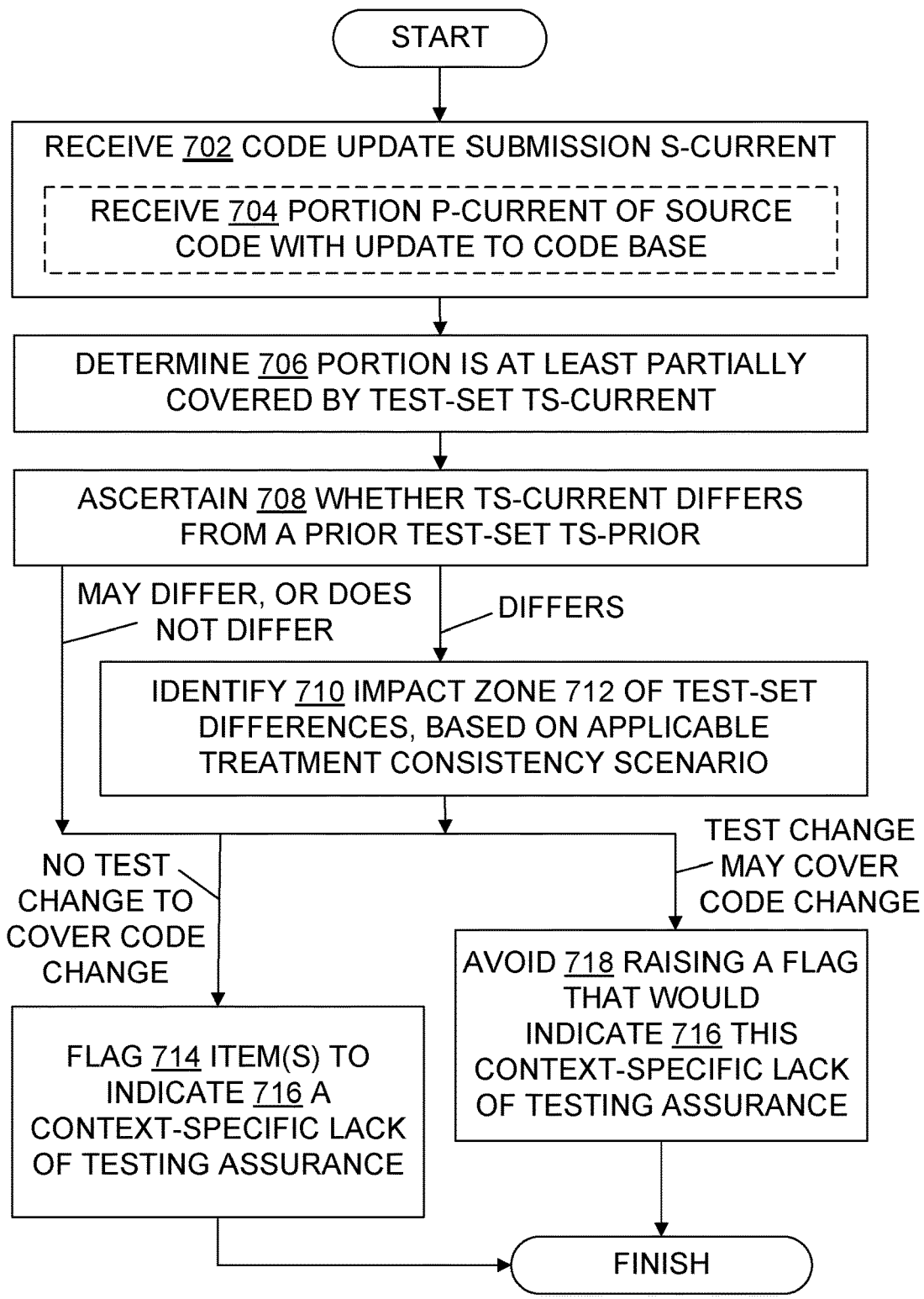
FIG. 7 is a flowchart illustrating steps in some software testing assurance methods.

With the foregoing context in mind, FIG. 4 illustrates seven scenarios 400, denoted for reference as scenario A through scenario G. The scenarios are not listed in any particular order, and as noted above are not presented as a comprehensive set of all scenarios that involve updates to source code or updates to associated tests against the source code, or both. FIG. 7 illustrates the same seven scenarios as FIG. 4, but using idealized source code. Idealized source code is depicted graphically with dots and line segments, instead of as source code text, to emphasize that the discussion is not limited to any particular programming language.

FIG. 5 shows an idealized portion of source code 220, to illustrate different ways source code can be updated. For convenient reference, the lines in which the idealized source code is listed are numbered (1) through (4) in FIG. 5, but teachings herein also apply to source codes that are not arranged thus in a column of lines. The left side of FIG. 5 shows the source code before the edits that produce the update, and the right side of FIG. 5 shows the code after the edits have been made. The source code in line (1) on the left-side is not edited; it is the same in the right-side updated portion of code as it is in the left-side prior version of the code. The code in line (2) on the left-side is also not edited. The code in line (3) on the left-side occupies line (4) on the right-side, because a new line of code has been inserted above it. The new line of code is represented on the right-side as four consecutive dots. The number of dots used in this graphic is not important to the teachings presented herein. The source code in line (3) on the left-side has been edited, by inserting text or deleting text or substituting text or some combination thereof. This edited code is represented on the right-side as seven consecutive dots. Again, the number of dots used in this graphic is not important to the teachings presented herein. The code in line (4) on the left-side has been deleted by the editing, so it has no corresponding line segments or dots representing it on the right-side. In short, as illustrated by FIG. 5, an update to source code may be implemented using text insertion, text deletion, text substitution, or a combination thereof, and an update does not necessarily change every line of code in a submission's code portion 218.

In view of FIGS. 4 and 5, FIG. 6 may be understood as showing the following scenarios. In each scenario, only part of the source code (depicted as dots) has been updated. In scenario A, changed tests provide at least some coverage of an entire submitted portion 218 of source code. In scenario B, the entire submitted portion 218 of source code is again covered by tests, but those tests have not been updated. In scenario C, updated tests provide at least some coverage of the updated part of a submitted portion 218 of source code; no tests cover the non-updated part of the submitted code. In scenario D, non-updated tests provide at least some coverage of the updated part of a submitted portion 218 of source code; no tests cover the non-updated part of the submitted code. In scenario E, tests are updated but they only cover non-updated parts of the source code. In scenario F, non-updated tests cover non-updated parts of the source code; no tests cover the updated source code. In scenario G, no tests cover any part of the submitted source code portion.

In some embodiments, one or more of the scenarios A though G are detected, and then in each scenario other than A and C the embodiment notifies the user that it would be prudent to update the test suite 230 to cover at least the updated part of the submitted code. In scenario A and scenario C, the embodiment determines that some update has been made to tests that pertain to updates in the submitted source code, and therefore no warning is given.

Some embodiments use or provide a computing system 202 which is operable to facilitate software testing assurance. This example system includes a processor 110, a memory 112 in operable communication with the processor, and an assurance code 204. Upon execution with the processor, the assurance code 204 performs a software testing assurance method that includes receiving a code update submission 216 denoted here as S-current. The submission S-current includes a portion 218 denoted here as P-current, which in turn includes an update 222 to a source code 220. The software testing assurance method also includes determining that the portion P-current is at least partially covered by a test-set 232 (denoted here as TS-current) of a testing suite 230. The software testing assurance method also includes ascertaining whether the test-set TS-current differs from a test-set TS-prior which at least partially covered a portion P-prior of a code update submission S-prior. In this context, S-prior is older than S-current, and P-current updates P-prior. The software testing assurance method also includes flagging at least one item 228 to indicate a lack of testing assurance for the P-current update based on the TS-current test-set when the ascertaining ascertains that TS-current does not differ from TS-prior. The flagging raises a flag of at least one of the following items: S-current, P-current, or TS-current.

In some embodiments, the system 202 includes an integrated development environment 210, and the assurance code 204 resides at least partially in the integrated development environment.

In some embodiments, the system 202 includes an extensible software development tool 214, and the assurance code 204 resides at least partially in an extension 212 of the extensible software development tool. When the extension 212 is functionally installed in the extensible software development tool, the assurance code 204 accordingly also resides in the extensible software development tool.

In some embodiments, the test-set 232 TS-current resides in the system 202, and the test-set TS-current includes assertions of values to be produced by execution of at least part of the portion P-current. As an example of such assertions, a PQ( ) function detailed elsewhere herein accepts an integer value representing a month and returns a string indicating which calendar quarter that month is in; "PQ" stands for "Print Quarter". One of several associated assertion tests 232 asserts that PQ(2) equals "first quarter", because 2 represents February, and February in the calendar year's first quarter.

In some embodiments, the system 202 is configured to require that any flags 226 raised by the assurance code 204 be resolved before the portion P-current is accepted. This naturally leads to the question of what it means to be accepted. In some embodiments, a portion 218 being accepted means at least one of the following: the portion is accepted for inclusion in a repository, the portion is accepted for peer review, or the portion is accepted for inclusion in a build.

In some embodiments, the system 202 also includes a coverage report 236 generated by a coverage reporting tool 234. The coverage report represents test coverage 302 of at least a portion of the source code by the test-set TS-current. In some embodiments, the system 202 also or alternately includes the coverage reporting tool 234 itself. The coverage reporting tool 234 is executable to check test coverage 302 of at least a portion 218 of the source code 220 by the test-set 232 TS-current.

Other system embodiments are also described herein, either directly or derivable as system versions of described methods or configured media, informed by the extension discussion herein of computing hardware.

Methods

FIG. 7 illustrates an example method 700 for optimizing software testing assurance. An enhanced system or other device or location receives 702 a code update submission, which includes in particular receiving 704 a portion of the submission that contains some source code, at least part of which is updated source code. The illustrated method determines 706 that the source code portion is at least partially covered by a testing suite. This could include, for example, determining that one of the FIG. 6 scenarios A through F applies, as opposed to scenario G. The illustrated method ascertains whether the relevant test-set differs from a prior version, in other words, whether the test-set that pertains to the source code portion has changed. This may include or be joined with identifying an impact zone 712 of the test-set differences. FIG. 6 illustrates several different impact zones in the form of dashed lines, as indicated by the legend in FIG. 6 that ties areas enclosed in a dashed line to "changed test coverage". Returning attention to FIG. 7, the illustrated method either flags 714 item(s) to indicate 716 a lack of testing assurance in the specific context defined by the portion, update, and test-set versions, or else the illustrated method avoids 718 raising such a flag.

Figures 8, 9:
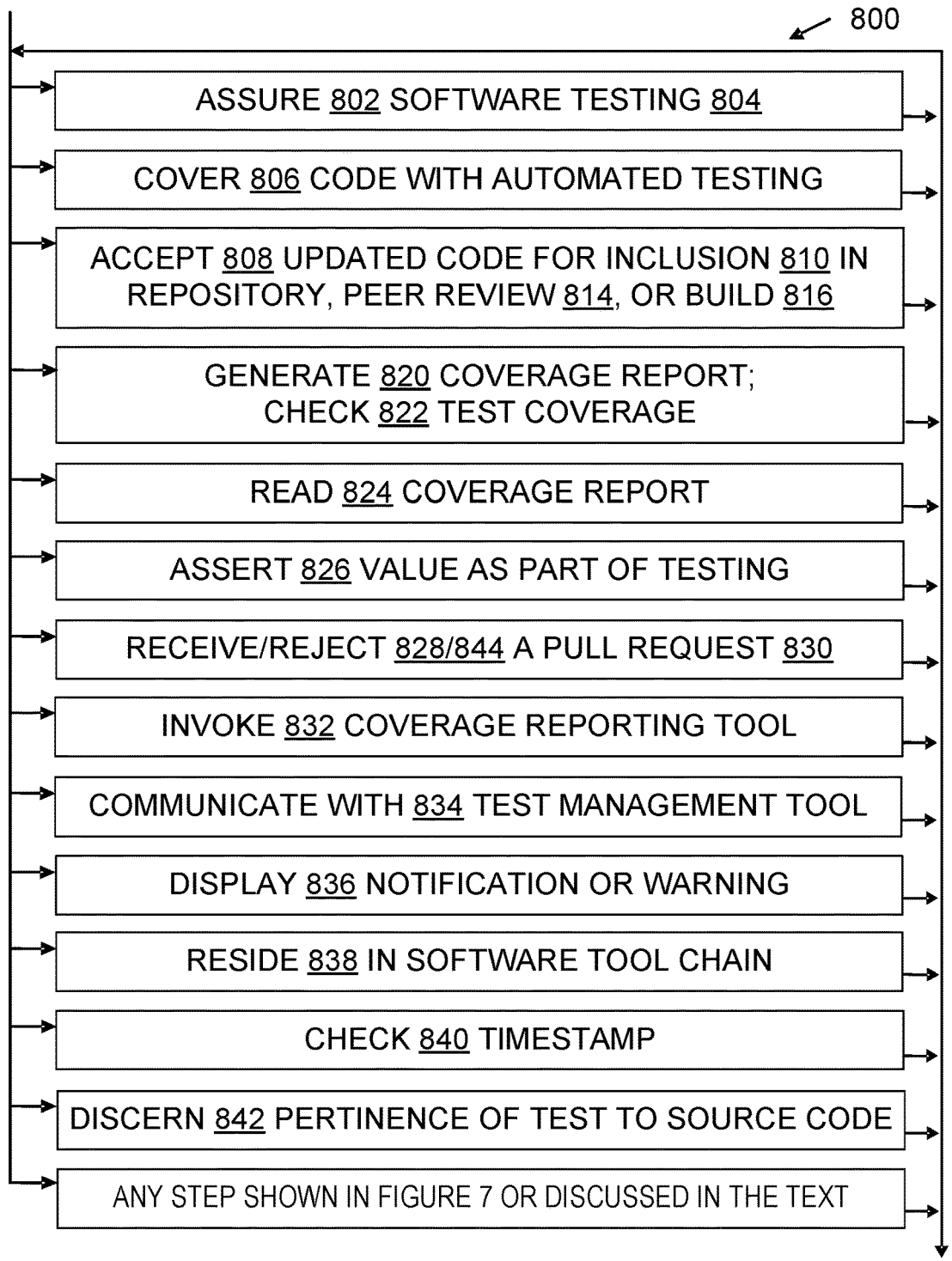
FIG. 8 is a flowchart further illustrating steps in some software testing assurance methods.
FIG. 9 is a block diagram illustrating a repository.

Technical methods shown in the Figures or otherwise disclosed will be performed automatically, e.g., by a tool enhanced with assurance code 204, unless otherwise indicated. Methods may also be performed in part automatically and in part manually to the extent action by a human administrator or other human person is implicated, e.g., entering a command to submit a portion of source code to a repository or build a project executable using updated source code. No method contemplated as innovative herein is entirely manual. In a given embodiment zero or more illustrated steps of a method may be repeated, perhaps with different parameters or data to operate on. Steps in an embodiment may also be done in a different order than the top-to-bottom order that is laid out in FIGS. 7 and 8. Steps may be performed serially, in a partially overlapping manner, or fully in parallel. In particular, the order in which flowchart 800 items are traversed to indicate the steps performed during a method may vary from one performance of the method to another performance of the method. The traversal order may also vary from one method embodiment to another method embodiment. Steps may also be omitted, combined, renamed, regrouped, be performed on one or more machines, or otherwise depart from the illustrated flow, provided that the method performed is operable and conforms to at least one claim.

Some embodiments use or provide a method for software testing assurance. This method includes electronically receiving 702 a code update submission S-current, the code update submission S-current including a portion P-current having one or more lines of a source code, the portion P-current including an update to the source code. This method also includes automatically determining 706 that the portion P-current of source code is at least partially covered by a test-set TS-current of a testing suite. This method also includes automatically ascertaining 708 whether the test-set TS-current differs from a test-set TS-prior which at least partially covered a portion P-prior of a code update submission S-prior, where S-prior is older than S-current, and where P-current updates P-prior. This method also includes automatically flagging 714 at least one item to indicate a lack of testing assurance for the update contained in P-current based on the TS-current test-set when the ascertaining ascertains that TS-current does not differ from TS-prior, and otherwise avoiding 718 flagging any item on the basis of TS-current not differing from TS-prior relative to P-current, wherein the at least one item which is flagged includes at least one of: S-current, P-current, or TS-current.

In some embodiments, wherein the ascertaining ascertains that TS-current differs from TS-prior, the method further includes discerning 842 that no difference between TS-prior and TS-current pertains to any test which covers P-current, and then flagging 714 the item to indicate a lack of testing assurance for the update contained in P-current.

In some embodiments, wherein the ascertaining ascertains that TS-current differs from TS-prior, the method further includes discerning 842 that no difference between TS-prior and TS-current pertains to any test which covers the update in P-current, and then flagging 714 the item to indicate a lack of testing assurance for the update contained in P-current.

In some embodiments, receiving 702 the code update submission S-current includes receiving 828, 702 a pull request 830, namely, a data structure which includes a request for the portion P-current to be pulled into a repository 902 containing the source code of a project, application, program, or other artifact that relies on source code compilation or interpretation to provide functionality.

In some embodiments, determining 706 that the portion P-current of source code is at least partially covered by the test-set TS-current includes reading 824 a coverage report generated by a coverage reporting tool, e.g., by opening a file containing the report and parsing the file's contents, or by receiving and parsing an XML data structure or another digital data structure containing data about test coverage 302. In some embodiments, determining 706 that the portion P-current of source code is at least partially covered by the test-set TS-current includes invoking 832 and communicating with 834 a coverage reporting tool to check coverage of at least a portion of the source code by the test-set TS-current.

In some embodiments, ascertaining 708 whether the test-set TS-current differs from the test-set TS-prior includes checking 840 a timestamp of the test-set TS-current. In some, ascertaining 708 includes invoking 832 and communicating with 834 an automated testing management tool which tracks at least the test-set TS-current.

In some embodiments, wherein at least one item is flagged, the method further includes notifying 836 a user by displaying a notification 242 indicating that a line of source code is at least partially covered by a test but the test should be reviewed as it does not necessarily provide full coverage. In some embodiments, the method includes displaying 836 a notification 242 that lists at least two of the following kinds of code coverage 302: function coverage 304, statement coverage 308, branch coverage 312, condition coverage 320, decision coverage 306, path coverage 316, entry/exit coverage 314, loop coverage 322, finite state machine state coverage 310, or data-flow coverage 318. Other embodiments display a proper subset of these kinds of code coverage, e.g., only statement coverage and branch coverage, or only function coverage alone.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as a testing assurance code 204, acceptance status data structures 224, flags 226, coverage reports 236, and tools 234, 238, in the form of data 118 and instructions 116, read from a removable storage medium 114 and/or another source such as a network connection, to form a configured storage medium. The configured storage medium 112 is capable of causing a computer system to perform technical process steps for software testing assurance to detect potential deficiencies in test coverage, as disclosed herein. The Figures thus help illustrate configured storage media embodiments and process embodiments, as well as system and process embodiments. In particular, any of the process steps illustrated in FIG. 7 or 8, or otherwise taught herein, may be used to help configure a storage medium to form a configured storage medium embodiment.

Some embodiments use or provide a storage medium 112, 114 configured with code which upon execution by one or more processors performs a software testing assurance method which includes receiving 702 a code update submission S-current, the code update submission S-current including a portion P-current including an updated source code; determining 706 that the portion P-current is at least partially covered by a test-set TS-current of a testing suite; ascertaining 708 whether the test-set TS-current differs from a test-set TS-prior which at least partially covered a portion P-prior of a code update submission S-prior, where S-prior is older than S-current, and where P-current updates P-prior; and flagging 714 at least one item to indicate a lack of testing assurance for P-current based on the TS-current test-set when the ascertaining ascertains that TS-current does not differ from TS-prior, and otherwise avoiding 718 flagging any item on the basis of TS-current not differing from TS-prior relative to P-current, wherein the at least one item which is flagged includes at least one of: S-current, P-current, or TS-current.

In some embodiments, receiving 702 the code update submission S-current includes receiving 828 a pull request which includes a request for the portion P-current to be pulled into a repository.

In some embodiments, wherein the ascertaining ascertains 708 that TS-current differs from TS-prior, the method further includes discerning 842 that no difference between TS-prior and TS-current pertains to any test which covers any part of P-current 218, and then flagging 714 the item to indicate a lack of testing assurance for the update contained in P-current.

In some embodiments, wherein the ascertaining ascertains 708 that TS-current differs from TS-prior, the method further includes discerning 842 that no difference between TS-prior and TS-current pertains to any test which covers the update 222 in P-current, and then flagging 714 the item to indicate a lack of testing assurance for the update contained in P-current.

In some embodiments, determining 706 that the portion P-current of source code is at least partially covered by the test-set TS-current includes reading 824 data generated 820 by a coverage reporting tool.

In some embodiments, ascertaining 708 whether the test-set TS-current differs from the test-set TS-prior includes at least one of the following:

checking 840 a timestamp of the test-set TS-current, or communicating 834 with an automated testing management tool.

In some embodiments, at least one item is flagged 714, and the method further includes notifying 836 a user by displaying a notification indicating that at least part of P-current source code is at least partially covered by a test but the test should be reviewed as it does not necessarily provide full coverage.

ADDITIONAL EXAMPLES AND OBSERVATIONS

One of skill will recognize that not every part of this disclosure, or any particular details therein, are necessarily required to satisfy legal criteria such as enablement, written description, or best mode. Also, embodiments are not limited to the particular programming languages, tool contexts, identifiers, fields, class definitions, or other implementation choices described herein. Any apparent conflict with any other patent disclosure, even from the owner of the present innovations, has no role in interpreting the claims presented in this patent disclosure. With this understanding, which pertains to all parts of the present disclosure, some additional examples and observations are offered.

One insight driving at least some of the embodiments is that code coverage during testing does not always equal test coverage of code. Thus, for optimal, possibly maximal, testing assurance, every bug fix pull request 830 should include test 232 changes. The test changes can be new tests, or modifications to existing tests, to cover the execution scenario that was addressed by the bug fix. An underlying assumption is that there is a test hole (i.e., lack of testing, a.k.a. testing deficiency) because this bug was missed in earlier testing. Even if the product code that is getting modified as part of this bug fix shows up as covered using existing tests, new tests or modifications to an existing test-set is prudent, and may be required to cover the execution scenario.

The code and test listing below illustrates an instance where a line of code is covered but it does not necessarily cover all the execution scenarios. The listing is line-numbered for reference, but in practice might not have such line-numbering. In this example listing, lines 02-15 may be taken as an example of a submitted code portion 218, and lines 01, 16-26 may be taken as an example of a test-set 232.

The test at line 20 pertains to at least code lines 06-07; it could also be understood to pertain to line 04, and even to line 02. Similarly, the test at line 21 pertains to at least code lines 08-09; it could also be understood to pertain to line 04, and even to line 02. Other tests shown pertain to code lines in a similar manner.

In this example listing, there is a bug in line 06; it should recite "month <=3" and not "month <3". But the tests used are all being passed, and the line which has the bug is covered by the test-set. If the developer fixes this bug, the tests will continue to pass, as before, and the line on which the fix is made will continue to show as covered in code coverage reports. However the execution scenario when the "month=3" is still not covered. By applying teachings presented herein, such pull requests can be flagged by the system, with users being asked to add test coverage for the scenario.

```
(01)    [TestClass]
(02)    public class UnitTest1
(03)    {
(04)        public string PQ(int month)
(05)        {
(06)            if (month < 3) // should be <=
(07)                return "first quarter";
(08)            else if (month <= 6)
(09)                return "second quarter";
(10)            else if (month <= 9)
(11)                return "third quarter";
(12)            else if (month <= 12)
(13)                return "fourth quarter";
(14)            else return "invalid input";
(15)        }
(16)        [TestMethod]
(17)        public void TestMethod1( )
(18)        {
(19)            UnitTest1 o = new UnitTest1( );
(20)            Assert.AreEqual(o.PQ(2), "first quarter");
(21)            Assert.AreEqual(o.PQ(6), "second quarter");
(22)            Assert.AreEqual(o.PQ(9), "third quarter");
(23)            Assert.AreEqual(o.PQ(12), "fourth quarter");
(24)            Assert.AreEqual(o.PQ(13), "invalid input");
(25)        }
(26)    }
```

Some embodiments help reduce, or avoid increasing, technical debt which is incurred by adding code without thorough automated testing of the code. This may be especially beneficial in projects using an agile development methodology, or in continuous integration continuous deployment environments, because bugs are easier to fix, and more likely to be fixed correctly, when the code involved is fresh in the developer's mind, not yet displaced by the rapid flow of other code considered in agile or CICD environments. Similarly, tests are more likely to be well-coordinated with the code under test when the code is fresh.

Some embodiments use or provide a software testing assurance method which includes receiving 828 a pull request 830. The pull request includes a source code portion 218 which indicates source code to be changed in a repository. The pull request also includes a test section 232 which indicates automated testing that is associated with the source code. In the example above, for instance, the source code portion could be lines 01-15 and the test section could be lines 16-26. The method also includes ascertaining 708 whether the test section indicates any change to automated testing that is associated with the source code. When the test section indicates a change to automated testing that is associated with the source code, the method includes accepting 808 the pull request, and when the test section does not indicate any change to automated testing that is associated with the source code, the method includes rejecting 844 the pull request.

Some embodiments operate as follows. The embodiment determines that code being submitted includes an update; this may be implicit, e.g., by virtue of code being part of a pull request. The embodiment finds the tests that cover the code, e.g., by using one or more tools 234, 238. If the tests that cover the code have not changed, then the embodiment raises 714 a flag. If at least one test that covers the code has changed, the embodiment doesn't raise a flag, at least not yet. Some embodiments may yet raise a flag, after determining that the changed test does not pertain to the updated part of the submitted source code.

In particular, some embodiments recognize a situation where at least one test has changed, but the change does not pertain to any of the submitted code, and raise a flag even though the tests changed. This could happen, for example, if the code portion of interest is portion A, and the tests cover portions A, B, and C, and the change in the test pertains only to B and C but not to A. Some embodiments recognize a situation where at least one test has changed, but the change does not pertain to the updated line(s) of the submitted code. So the embodiment raises a flag even though the tests changed and even though the change pertains to part of the portion P-current. This could happen, for example, if portion P-current has lines 1-10, the update is in line 1 of portion P-current, the tests cover lines 1-10, and the change in the test pertains only to line 3 but not to line 1.

SOME ADDITIONAL COMBINATIONS AND VARIATIONS

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants describe above.

CONCLUSION

In short, with the benefit of teachings provided herein, an embodiment may be used to detect possible holes in automated testing of software under development. Full line coverage by tests 232 does not necessarily indicate actual coverage of execution scenarios, e.g., condition coverage 320, decision coverage 306, and other kinds of execution scenario coverage 302 may be lacking even when all source code statements are nominally covered 308. When source code changes 222 are submitted, and corresponding test-sets 232 remain unchanged, users 104 are notified 836 that adequate testing 804 is not assured by the current test-set. Testing assurance code 204 in a development tool chain 208 may flag 714 an item 228 such as a pull request 830, 216, a test-set 232, or source code 220 of a submission 216, to indicate 716 a lack of testing assurance. In some cases, an assurance-enhanced tool 122, 208, 210, 214, 202 may require that new or different tests be provided with updated source code as a prerequisite for that source code to be accepted 808 for inclusion 810 in a repository 902 or a build 816, or even as a prerequisite for peer review 814, for example. That is, inconsistency in the treatment of source code and corresponding test-sets is flagged, and brought to the attention of developers, testers, and other users, to either reduce the risk of test holes by obtaining updated tests, or to manage that risk by obtaining informed consent before the source code update moves forward in the workflow.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 7 and 8 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific APIs, specific fields, specific kinds of components, and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computing system operable to facilitate software testing assurance, the system comprising:
   a processor;
   a memory in operable communication with the processor; and
   an assurance code, which upon execution with the processor performs a software testing assurance method that includes (a) receiving a code update submission S-current, the submission S-current including a portion P-current which includes an update to a source code, (b) determining that the portion P-current is at least partially covered by a test-set TS-current of a testing suite, (c) ascertaining whether the test-set TS-current differs from a test-set TS-prior which at least partially covered a portion P-prior of a code update submission S-prior, where S-prior is older than S-current, and where P-current updates P-prior, and (d) flagging at least one item to indicate a lack of testing assurance for the P-current update based on the TS-current test-set when the ascertaining ascertains that TS-current does not differ from TS-prior, wherein the flagging raises a flag of at least one of the following items: S-current, P-current, or TS-current.

2. The system of claim 1, wherein the system comprises an integrated development environment, and the assurance code resides at least partially in the integrated development environment.

3. The system of claim 1, wherein the system comprises an extensible software development tool, and the assurance code resides at least partially in an extension of the extensible software development tool.

4. The system of claim 1, wherein the test-set TS-current resides in the system, and the test-set TS-current comprises assertions of values to be produced by execution of at least part of the portion P-current.

5. The system of claim 1, wherein the system is configured to require that any flags raised by the assurance code be resolved before the portion P-current is accepted, and wherein a portion being accepted means at least one of the following: the portion is accepted for inclusion in a repository, the portion is accepted for peer review, or the portion is accepted for inclusion in a build.

6. The system of claim 1, wherein the system further comprises at least one of the following:
a coverage report generated by a coverage reporting tool and representing test coverage of at least a portion of the source code by the test-set TS-current; or
a coverage reporting tool executable to check test coverage of at least a portion of the source code by the test-set TS-current.

7. A software testing assurance method implemented with a computing system having at least one processor coupled with memory-stored instructions which, when executed by the processor, perform the method, comprising:
electronically receiving a code update submission S-current, the code update submission S-current including a portion P-current having one or more lines of a source code, the portion P-current including an update to the source code;
automatically determining that the portion P-current of source code is at least partially covered by a test-set TS-current of a testing suite;
automatically ascertaining whether the test-set TS-current differs from a test-set TS-prior which at least partially covered a portion P-prior of a code update submission S-prior, where S-prior is older than S-current, and where P-current updates P-prior; and
automatically flagging at least one item to indicate a lack of testing assurance for the update contained in P-current based on the TS-current test-set when the ascertaining ascertains that TS-current does not differ from TS-prior, and otherwise avoiding flagging any item on the basis of TS-current not differing from TS-prior relative to P-current, wherein the at least one item which is flagged includes at least one of: S-current, P-current, or TS-current.

8. The method of claim 7, wherein the ascertaining ascertains that TS-current differs from TS-prior, and the method further comprises discerning that no difference between TS-prior and TS-current pertains to any test which covers P-current, and then flagging the item to indicate a lack of testing assurance for the update contained in P-current.

9. The method of claim 7, wherein the ascertaining ascertains that TS-current differs from TS-prior, and the method further comprises discerning that no difference between TS-prior and TS-current pertains to any test which covers the update in P-current, and then flagging the item to indicate a lack of testing assurance for the update contained in P-current.

10. The method of claim 7, wherein receiving the code update submission S-current comprises receiving a pull request which includes a request for the portion P-current to be pulled into a repository containing the source code.

11. The method of claim 7, wherein determining that the portion P-current of source code is at least partially covered by the test-set TS-current comprises at least one of the following:
reading a coverage report generated by a coverage reporting tool; or
invoking a coverage reporting tool to check coverage of at least a portion of the source code by the test-set TS-current.

12. The method of claim 7, wherein ascertaining whether the test-set TS-current differs from the test-set TS-prior comprises at least one of the following:
checking a timestamp of the test-set TS-current; or
invoking an automated testing management tool which tracks at least the test-set TS-current.

13. The method of claim 7, wherein at least one item is flagged, and wherein the method further comprises notifying a user by displaying at least one of the following:
a notification indicating that a line of source code is at least partially covered by a test but the test should be reviewed as it does not necessarily provide full coverage; or
a notification listing at least two of the following kinds of code coverage: function coverage, statement coverage, branch coverage, condition coverage, decision coverage, path coverage, entry/exit coverage, loop coverage, finite state machine state coverage, or data-flow coverage.

14. A storage medium configured with code which upon execution by one or more processors performs a software testing assurance method, the method comprising:
receiving a code update submission S-current, the code update submission S-current including a portion P-current including an updated source code;
determining that the portion P-current is at least partially covered by a test-set TS-current of a testing suite;
ascertaining whether the test-set TS-current differs from a test-set TS-prior which at least partially covered a portion P-prior of a code update submission S-prior, where S-prior is older than S-current, and where P-current updates P-prior; and
flagging at least one item to indicate a lack of testing assurance for P-current based on the TS-current test-set when the ascertaining ascertains that TS-current does not differ from TS-prior, and otherwise avoiding flagging any item on the basis of TS-current not differing from TS-prior relative to P-current, wherein the at least one item which is flagged includes at least one of: S-current, P-current, or TS-current.

15. The configured storage medium of claim 14, wherein receiving the code update submission S-current comprises receiving a pull request which includes a request for the portion P-current to be pulled into a repository.

16. The configured storage medium of claim 14, wherein the ascertaining ascertains that TS-current differs from TS-prior, and the method further comprises discerning that no difference between TS-prior and TS-current pertains to any test which covers any part of P-current, and then flagging the item to indicate a lack of testing assurance for the update contained in P-current.

17. The configured storage medium of claim 14, wherein the ascertaining ascertains that TS-current differs from TS-prior, and the method further comprises discerning that no difference between TS-prior and TS-current pertains to any test which covers the update in P-current, and then flagging the item to indicate a lack of testing assurance for the update contained in P-current.

18. The configured storage medium of claim 14, wherein determining that the portion P-current of source code is at least partially covered by the test-set TS-current comprises reading data generated by a coverage reporting tool.

19. The configured storage medium of claim 14, wherein ascertaining whether the test-set TS-current differs from the test-set TS-prior comprises at least one of the following:
    checking a timestamp of the test-set TS-current; or
    communicating with an automated testing management tool.

20. The configured storage medium of claim 14, wherein at least one item is flagged, and wherein the method further comprises notifying a user by displaying a notification indicating that at least part of P-current source code is at least partially covered by a test but the test should be reviewed as it does not necessarily provide full coverage.

\* \* \* \* \*